(12) United States Patent
Bae

(10) Patent No.: US 9,564,621 B2
(45) Date of Patent: Feb. 7, 2017

(54) RECHARGEABLE BATTERY PACK

(71) Applicant: SAMSUNG SDI CO., LTD., Yongin-si, Gyeonggi-do (KR)

(72) Inventor: Kwang-Soo Bae, Yongin-si (KR)

(73) Assignee: Samsung SDI Co., Ltd., Yongin-si, Gyeonggi-do (KR)

( * ) Notice: Subject to any disclaimer, the term of this patent is extended or adjusted under 35 U.S.C. 154(b) by 244 days.

(21) Appl. No.: 14/149,944

(22) Filed: Jan. 8, 2014

(65) Prior Publication Data

US 2015/0050536 A1  Feb. 19, 2015

(30) Foreign Application Priority Data

Aug. 13, 2013  (KR) .................. 10-2013-0096164

(51) Int. Cl.
| | |
|---|---|
| H01M 6/42 | (2006.01) |
| H01M 2/00 | (2006.01) |
| H01M 2/02 | (2006.01) |
| H01M 2/10 | (2006.01) |
| H01M 2/20 | (2006.01) |

(52) U.S. Cl.
CPC ............. *H01M 2/105* (2013.01); *H01M 2/204* (2013.01)

(58) Field of Classification Search
CPC ...... H01M 2/02; H01M 2/202; H01M 2/0217; H01M 2/1016; H01M 2/105
USPC ........................................ 429/163, 178, 179
See application file for complete search history.

(56) References Cited

U.S. PATENT DOCUMENTS

| | | | | |
|---|---|---|---|---|
| 5,227,263 A | * | 7/1993 | Blier ................... | H01M 2/1055 429/100 |
| 5,935,729 A | * | 8/1999 | Mareno ............... | H01M 2/1055 292/159 |
| 7,926,971 B2 | * | 4/2011 | West ................... | H01M 2/1055 320/107 |
| 8,556,661 B2 | | 10/2013 | Kwon et al. | |

FOREIGN PATENT DOCUMENTS

| | | |
|---|---|---|
| KR | 10-2009-0011898 A | 2/2009 |
| KR | 10-2010-0000888 A | 1/2010 |

\* cited by examiner

*Primary Examiner* — Patrick Ryan
*Assistant Examiner* — Julian Anthony
(74) *Attorney, Agent, or Firm* — Lee & Morse, P.C.

(57) ABSTRACT

A rechargeable battery pack includes a case with first and second openings, the first and second openings facing each other, a plurality of unit cells in the case, each unit cell including a rechargeable battery and having a longitudinal direction extending from the first opening of the case toward the second opening of the case, a first cover coupled to the first opening of the case, the first cover selectively connecting via elastic members terminals of the unit cells facing the first opening, and a second cover coupled to the second opening of the case, the second cover connecting via elastic members terminals of the unit cells facing the second opening in correspondence to terminals connected through the first cover.

14 Claims, 13 Drawing Sheets

RECHARGEABLE BATTERY PACK

CROSS-REFERENCE TO RELATED APPLICATION

Korean Patent Application No. 10-2013-0096164, filed on Aug. 13, 2013, in the Korean Intellectual Property Office, and entitled: "Rechargeable Battery Pack," is incorporated by reference herein in its entirety.

BACKGROUND

1. Field

The described technology relates generally to a rechargeable battery pack that outputs power by electrically connecting a plurality of unit cells.

2. Description of the Related Art

A rechargeable battery may be used as a unit cell or may be used by electrically connecting unit cells depending on the type of device using the rechargeable battery. For example, the rechargeable battery pack may include a plurality of unit cells, a protection circuit module (PCM) protecting the unit cells, and a case electrically connecting and installing, e.g., accommodating, the unit cells and the protection circuit module.

Such a rechargeable battery pack outputs power of a utilization voltage determined depending on the number of unit cells and a case corresponding thereto. For example, the rechargeable battery pack electrically connects the unit cells using tabs.

SUMMARY

The described technology has been made in an effort to provide a rechargeable battery pack that can output power of various utilization voltages by changing an electric connection of unit cells.

A rechargeable battery pack according to an exemplary embodiment includes a case with first and second openings, the first and second openings facing each other, a plurality of unit cells in the case, each unit cell including a rechargeable battery and having a longitudinal direction extending from the first opening of the case toward the second opening of the case, a first cover coupled to the first opening of the case, the first cover selectively connecting via elastic members terminals of the unit cells facing the first opening, and a second cover coupled to the second opening of the case, the second cover connecting via elastic members terminals of the unit cells facing the second opening in correspondence to terminals connected through the first cover.

The case may include a fastening hole formed in the length direction of the unit cell at external circumferences of the first and second openings, the first cover and the second cover may include through-holes that correspond to the fastening hole corresponding to the external circumferences of the first and second openings, and the first cover and the second cover may be mounted to the case by fastening members fastened to the fastening hole through the through-holes.

The first cover and the second cover may include a first tab and a second tab provided opposite to at least one of the unit cells and elastic portions protruded from the first tab and the second tab and contacting terminals of the unit cells.

The case may install the unit cells in a two row by six column matrix.

In the first cover, the first tab may include, among the six columns, an eleventh tab corresponding to the first columns, a twelfth tab corresponding to the second columns neighboring the first columns and the third columns, and a thirteenth tab corresponding to the fourth columns neighboring the third columns.

In the second cover, the second tab may include a twenty-first tab corresponding to the first and second columns and a twenty-second tab corresponding to the third columns neighboring the second columns and the fourth columns.

In the first cover, the first tab may include, among the six columns, an eleventh tab corresponds to the first columns, a twelfth tab corresponding to the second columns neighboring the first columns and the third columns, and a thirteenth tab corresponding to the fourth columns neighboring the third columns and the fifth columns.

In the second cover, the second tab may include: a twenty-first tab corresponding to the first columns and the second columns; a twenty-second tab corresponding to the third columns neighboring the second columns and the fourth columns; and a twenty-third tab corresponding to the fifth columns neighboring the fourth columns.

In the first cover, the first tab may include: among the two rows and the six columns, an eleventh tab corresponding to the first column of the first row; a twelfth tab corresponding to the second and third columns of the first row; a thirteenth tab corresponding to the fourth and fifth columns of the first row; a fourteenth tab corresponding to the second column of the second row; a fifteenth tab corresponding to the third and fourth columns of the second row; and a sixteenth tab corresponding to the sixth columns.

In the second cover, the second tab may include: among the two rows and the six columns, a twenty-first tab corresponding to the first and second columns of the first row; a twenty-second tab corresponding to the third and fourth columns of the first row; a twenty-third tab corresponding to the fifth and sixth columns of the first row; a twenty-fourth tab corresponding to the second and third columns of the second row; and a twenty-fifth tab corresponding to the fourth and sixth columns of the second row.

The case may include a through-hole formed in a direction that crosses the length direction of the unit cells at external circumferences of the first and second openings, the first cover and the second cover may include fastening holes inserted to interior circumferences of the first and second openings and corresponding to the through-hole, and the first cover and the second cover are mounted to the case by fastening members fastened to the fastening holes through the through-hole.

BRIEF DESCRIPTION OF THE DRAWINGS

Features will become apparent to those of ordinary skill in the art by describing in detail exemplary embodiments with reference to the attached drawings, in which.

DETAILED DESCRIPTION

Figure 1:
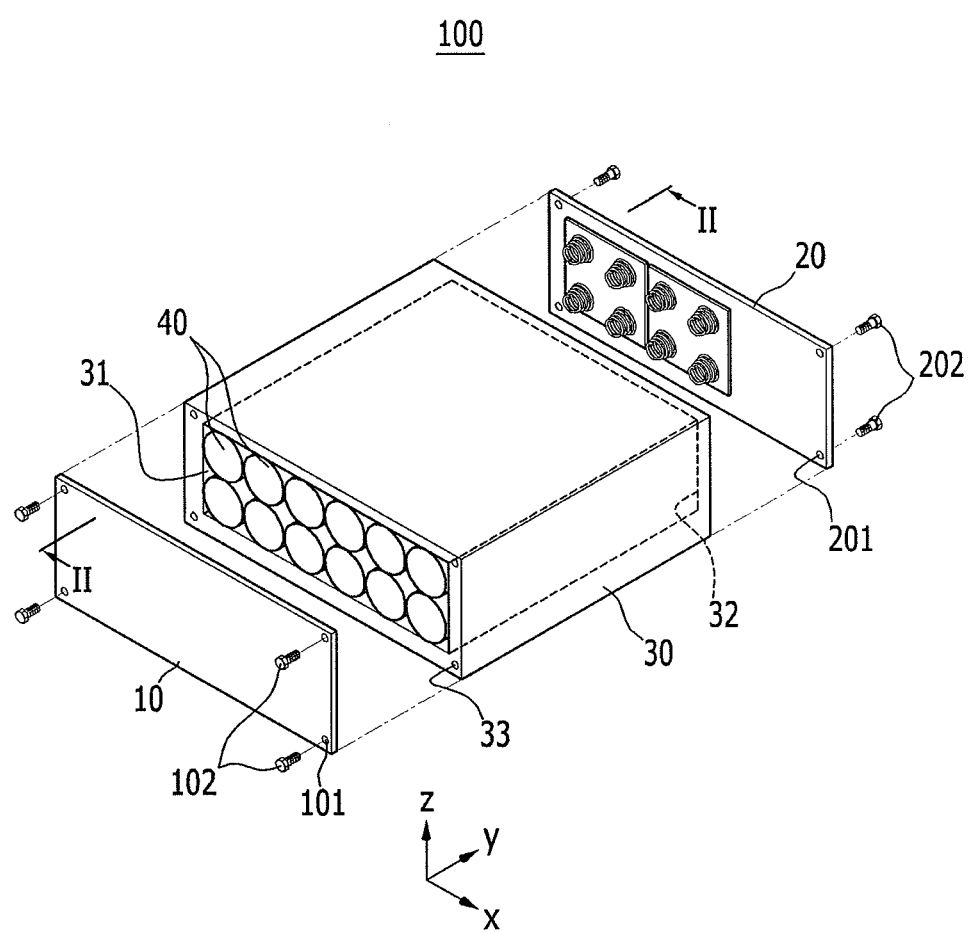
FIG. 1 illustrates an exploded view of a rechargeable battery pack according to a first exemplary embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art. Like reference numerals designate like elements throughout the specification.

Figure 2:
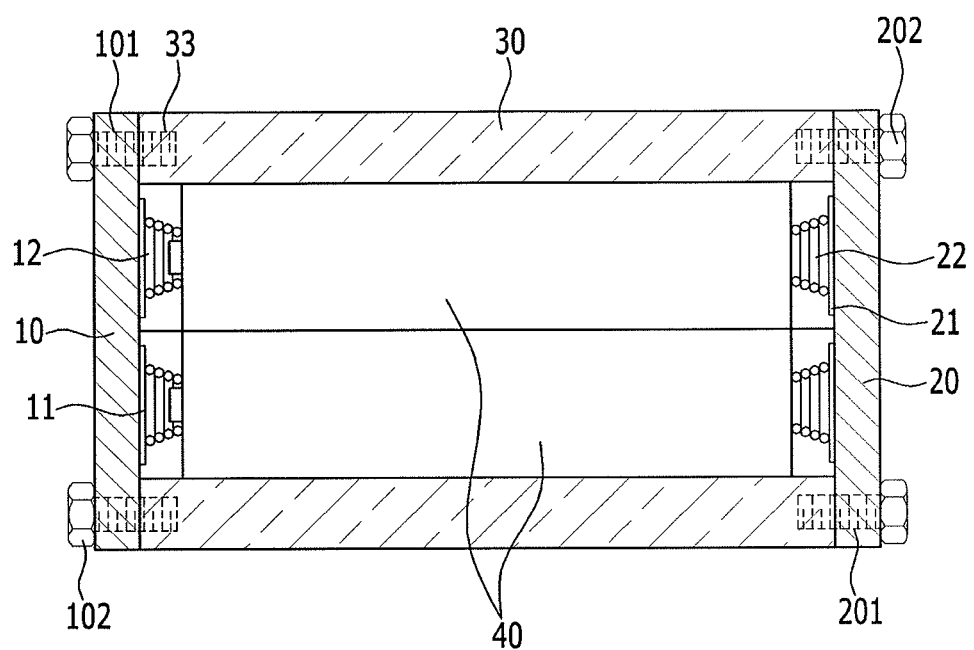
FIG. 2 illustrates a cross-sectional view of FIG. 1, taken along line II-II.

FIG. 1 illustrates an exploded view of a rechargeable battery pack 100 according to a first exemplary embodiment. FIG. 2 illustrates a cross-sectional view of FIG. 1 along line II-II.

Referring to FIG. 1 and FIG. 2, the rechargeable battery pack 100 of the first exemplary embodiment may include a case 30 receiving a plurality of unit cells 40, each unit cell 40 formed of a rechargeable battery, a first cover 10 coupled to a first opening 31 of the case 30, and a second cover 20 coupled to a second opening 32 of the case 30. Although it is not illustrated, the rechargeable battery pack 100 may further include a protection circuit module electrically connected to the plurality of unit cells 40 for protection of the unit cells 40 and a terminal connected to a device using the rechargeable battery pack 100 to supply power of a utilization voltage.

For example, the unit cells 40 may be formed of cylindrical rechargeable batteries iteratively performing charging and discharging. Although it is not illustrated, each unit cell 40 includes an electrode assembly formed by layering a positive electrode and a negative layer, interposing a separator therebetween and spirally winding the positive electrode, the separator, and the negative electrode, a cell case installing, e.g., accommodating, an electrolyte solution and the electrode assembly, and a cap assembly fastened to the cell case in an air tight structure and electrically connected to the electrode assembly.

The first opening 31 and the second opening 32 are opened to both sides of the case 30 along a length direction (i.e., y-axis direction). That is, the case 30 is formed in the shape of a rectangular pipe having two open sides facing each other in the y-axis direction and additional four sides connected with each other. For example, as illustrated in FIG. 1, the case 30 may install the unit cells 40 in a 2×6 matrix format. For convenience, columns from the left side to the right side are called first to sixth columns, and the upper row and the lower row are called respectively a first row and a second row.

The first cover 10 is coupled to the first opening 31 of the case 30 to elastically support first side terminals of the unit cells 40 by selectively connecting the terminals. The second cover 20 is coupled to the second opening 32 to elastically support second side terminals of the unit cells 40 by selectively connecting the terminals.

The rechargeable battery pack 100 sets a utilization voltage by electrically connecting the unit cells 40 using the first cover 10 and the second cover 20. According to embodiments, various utilization voltages may be set because the unit cells 40 are electrically connected by the first cover 10 and the second cover 20 via elastic members. That is, since the first cover 10 and the second cover 20 elastically support and connect the unit cells 40, welding may be omitted in the electric connection of the unit cells 40. Therefore, damage to the unit cell 40 due to welding may be prevented.

For example, the case 30 is provided with fastening holes 33 formed in external circumferences of the first and second openings 31 and 32 in the length direction (i.e., y-axis direction) of the unit cells 40. That is, as illustrated in FIG. 1, a depth of each fastening hole 33 extends along the y-axis direction, i.e., along a same direction as a longitudinal direction of the unit cells 40. The fastening holes 33 are formed at four corners of each of the first opening 31 and the second opening 32.

In addition, the first cover 10 and the second cover 20 are disposed in correspondence to the external circumferences of the first opening 31 and the second opening 32, respectively, and include through-holes 101 and 201 corresponding to the fastening holes 33 in the first and second openings 31 and 32. Since fastening members 102 and 202 are fastened to the fastening holes 33 through the through-holes 101 and 201 of the first and second covers 10 and 20, the first cover 10 and the second cover 20 are coupled to the case 30. For example, the fastening members 102 and 202 may be provided as set screws and thus being screw-coupled to the fastening holes 33.

Figure 3:
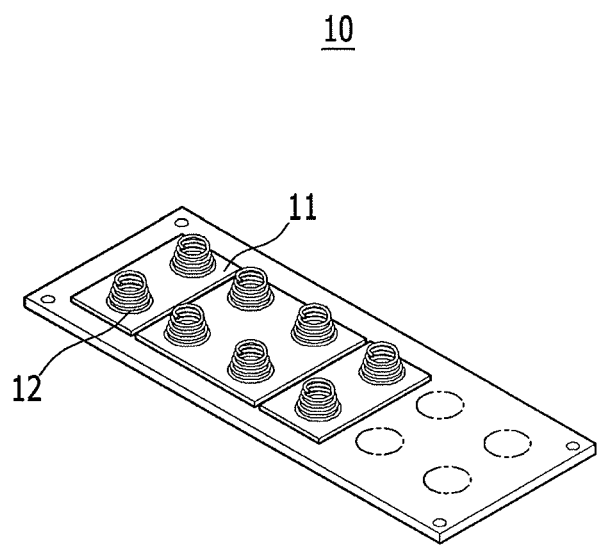
FIG. 3 illustrates an inner side perspective view of a first cover in FIG. 1.

FIG. 3 illustrates an inner side perspective view of the first cover 10 of FIG. 1. Referring to FIG. 3, the first cover 10 includes a first tab 11 provided opposite to at least one unit cell 40 and elastic portions 12 protruded from the first tab 11 and contacting terminals of the unit cell 40.

Figure 4:
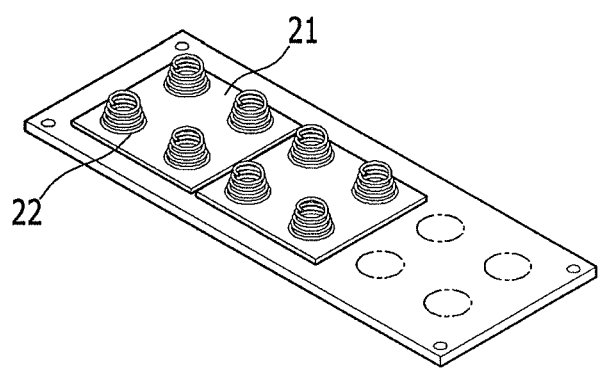
FIG. 4 illustrates an inner side perspective view of a second cover in FIG. 1.

FIG. 4 illustrates an inner side perspective view of the second cover 20 of FIG. 1. Referring to FIG. 4, the second cover 20 includes a second tab 21 provided opposite to at least one unit cell 40 and elastic portions 22 protruded from the second tab 21 and contacting terminals of the unit cell 40.

The first tab 11 and the second tab 21 are provided as conductors and fixed to one side of the first cover 10 and the second cover 20, respectively. The elastic portions 12 and 22 are formed as compress coil springs protruded respectively from the first tab 11 and the second tab 21 toward the unit cells 40.

The first cover 10 and the second cover 20 variously form the first tab 11 and the second tab 21 according to the utilization voltage. Hereinafter, a use state that realizes various utilization voltages will be described in further detail.

Figure 5:
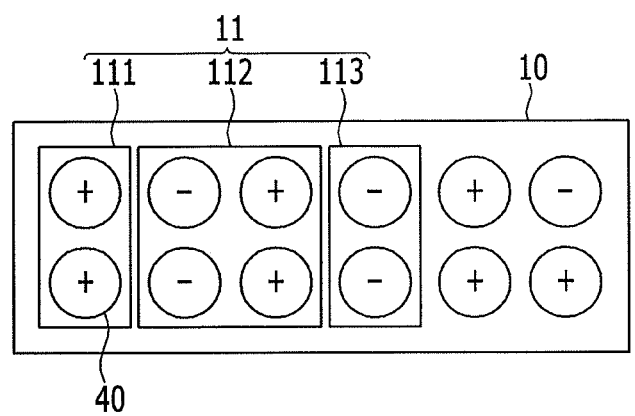
FIG. 5 illustrates an electric connection state view of unit cells by the first cover in a first use state of the rechargeable battery pack of FIG. 1.

FIG. 5 illustrates an electric connection state view of the unit cells 40 by the first cover 10 in a first use state of the rechargeable battery pack 100 of FIG. 1. It is noted that in FIG. 5, as well as FIGS. 6-10 below, columns in each figure are numbered from left to right, so the most left column in each figure is referred to as the first column, and the upper and lower rows are referred to as first and second rows, respectively.

Referring to FIG. 5, the first tab 11 in the first cover 10 includes an eleventh tab 111 corresponding to a first column of unit cells 40 among the six columns of unit cells 40, a twelfth tab 112 corresponding to a second column neighboring the first column and a third column, and a thirteenth tab 113 corresponding to a fourth column that neighbors the third column. That is, the eleventh tab 111 connects positive electrodes of two unit cells 40 of the first column in parallel. The twelfth tab 112 connects negative electrodes of two unit cells 40 of the second column in parallel, connects positive electrodes of two unit cells 40 of the third column in parallel, and connects the unit cells of the second column and the third column in series. The thirteenth tab 113 connects negative electrodes of two unit cells 40 of the fourth column in parallel.

Figure 6:
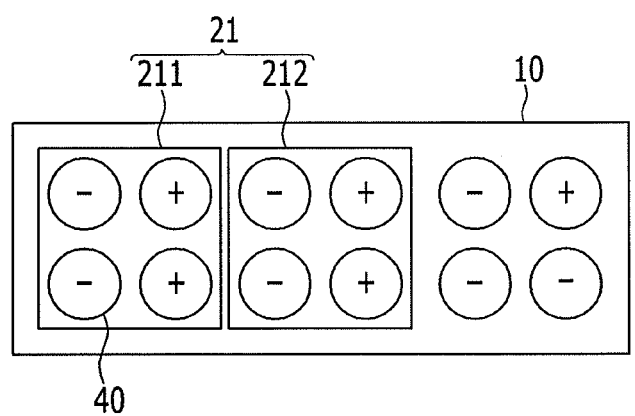
FIG. 6 illustrates an electric connection state view of unit cells by the second cover in the first use state of the rechargeable battery pack of FIG. 1.

Referring to FIG. 6, in the second cover 20, the second tab 21 includes a twenty-first tab 211 corresponding to the first column and the second column, and a twenty-second tab 212 corresponding to the third column neighboring the second column and the fourth column. The twenty-first tab 211 connects negative electrodes of two unit cells 40 of the first column in parallel, connects positive electrodes of two unit cells 40 of the second column in parallel, and connects the unit cells 40 of the first and second columns in series. The twenty-second tab 212 connects negative electrodes of two unit cells 40 of the third column in parallel, connects positive electrodes of two unit cells 40 of the fourth column in parallel, and simultaneously connects the unit cells 40 of the third and fourth columns in series.

Thus, in the first use state, the rechargeable battery pack 100 outputs power of a utilization voltage of 14.4V when a voltage of the unit cell 40 is 3.6V. In this case, unit cells 40 of the fifth and sixth columns are not in an operation state.

Figure 7:
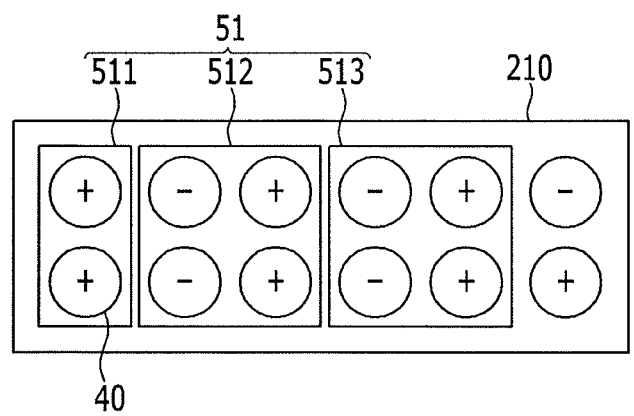
FIG. 7 illustrates an electric connection state view of unit cells by the first cover in a second use state of the rechargeable battery pack of FIG. 1.
Figure 8:
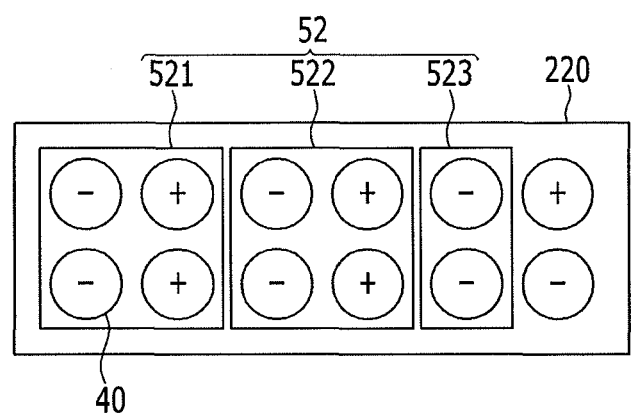
FIG. 8 illustrates an electric connection state view of unit cells by the second cover in the second use state of the rechargeable battery pack of FIG. 1.

FIG. 7 illustrates an electric connection state view of the unit cells 40 by a first cover 210 in a second use state of the rechargeable battery 100 of FIG. 1, and FIG. 8 illustrates an electric connection state view of the unit cells 40 by a second cover 220 in the second use state of the rechargeable battery pack 100 of FIG. 1.

Referring to FIG. 7, in the first cover 210, a first tab 51 includes an eleventh tab 511 corresponding to the first column among the six columns of unit cells 40, a twelfth tab 512 corresponding to the second column neighboring the first column and the third column, and a thirteenth tab 513 corresponding to the fourth column neighboring the third column and a fifth column.

That is, the eleventh tab 511 connects positive electrodes of two unit cells 40 of the first column in parallel. The twelfth tab 512 connects negative electrodes of two unit cells 40 of the second column in parallel, connects positive electrodes of two unit cells 40 of the third column in parallel, and at the same time connects the unit cells 40 of the second and third columns in series. The thirteenth tab 513 connects negative electrodes of two unit cells 40 of the fourth column in parallel, connects positive electrode of two unit cells 40 of the fifth column in parallel, and at the same time connects the unit cells 40 of the fourth and fifth columns in series.

Referring to FIG. 8, in the second cover 220, a second tab 52 includes a twenty-first tab 521 corresponding to the first columns and the second columns, a twenty-second tab 522 corresponding to the third columns neighboring the second columns and the fourth columns, and a twenty-third tab 523 corresponding to the fifth column neighboring the fourth column.

That is, the twenty-first tab 521 connects negative electrodes of two unit cells 40 of the first column in parallel, connects positive electrodes of two unit cells 40 of the second column in parallel, and at the same time connects the unit cells 40 of the first and second columns in series. The twenty-second tab 522 connects negative electrodes of two unit cells 40 of the third column in parallel, connects positive electrodes of unit cells 40 of the fourth column in parallel, and at the same time connects the unit cells 40 of the third and fourth columns in series. The twenty-third tab 523 connects negative electrodes of unit cells 40 of the fifth column in parallel.

Thus, in the second use state, the rechargeable battery pack 100 outputs power of a utilization voltage of 18V when a voltage of the unit cell 40 is 3.6V. In this case, unit cells 40 of the sixth column are not in an operation state.

Figure 9:
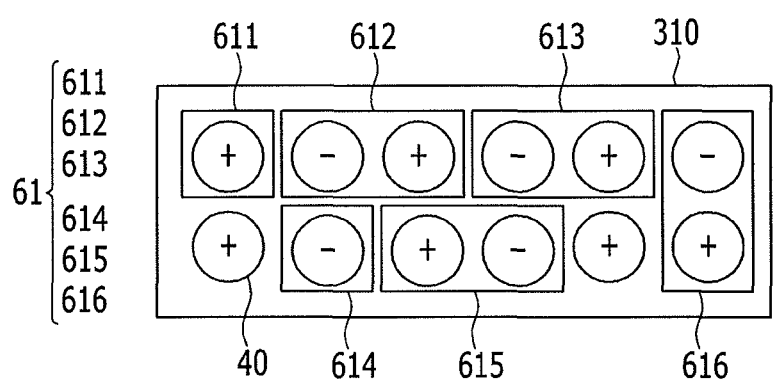
FIG. 9 illustrates an electric connection state view of unit cells by the first cover in a third use stage of the rechargeable battery pack of FIG. 1.
Figure 10:
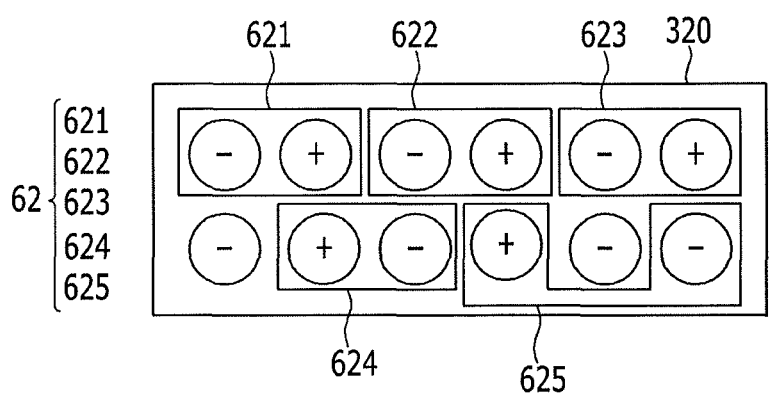
FIG. 10 illustrates an electric connection state view of unit cells by the second cover in the third use state of the rechargeable battery pack of FIG. 1.

FIG. 9 illustrates an electric connection state view of unit cells by a first cover 310 in a third use state of the rechargeable battery pack 100 of FIG. 1, and FIG. 10 illustrates an electric connection state view of unit cells 40 by a second cover 310 in the third use state of the rechargeable battery pack 100 of FIG. 1.

Referring to FIG. 9, in the first cover 310, a first tab 61 includes an eleventh tab 611 corresponding to the first column of the first row among the two rows of the first through six columns, a twelfth tab 612 corresponding to the second and third columns of the first row, a thirteen tab 613 corresponding to the fourth and fifth columns of the first row, a fourteenth tab 614 corresponding to the second column of the second row, a fifteenth tab 615 corresponding to the third and fourth columns of the second row, and a sixteenth tab 616 corresponding to the first and second rows of sixth column.

That is, the eleventh tab 611 is connected to a positive electrode of a unit cell 40 of the first column of the first row. The twelfth tab 612 connects negative and positive electrodes of two unit cells 40 of the second and third columns of the first row in series. The thirteenth tab 613 connects negative and positive electrodes of two unit cells 40 of the fourth and fifth columns of the first row in series. The fourteenth tab 614 is connected to a negative electrode of a unit cell 40 of the second column of the second row. The fifteenth tab 615 connects positive and negative electrodes of two unit cells 40 of the third and fourth columns of the second row in series. The sixteenth tab 616 connects negative and positive electrodes of two unit cells 40 of the sixth column in series.

Referring to FIG. 10, in the second cover 320, a second tab 62 includes a twenty-first tab 621 corresponding to the first and second columns of the first row among the two rows and the six columns, a twenty-second tab 622 corresponding to the third and fourth columns of the first row, a twenty-third tab 623 corresponding to the fifth and sixth columns of the first row, a twenty-fourth tab 624 corresponding to the second and third columns of the second row, and a twenty-fifth tab 625 corresponding to the fourth and sixth columns of the second row.

That is, the twenty-first tab 621 connects negative electrodes and electrodes of two unit cells 40 of the first and second columns of the first row in series. The twenty-second tab 622 connects negative and positive electrodes of two unit cells 40 of the third and fourth columns of the first row in series. The twenty-third tab 623 connects negative and positive electrodes of two unit cells 40 of the fifth and sixth columns of the first row in series. The twenty-fourth tab 624 connects negative and positive electrodes of two unit cells 40 of the second and third columns of the second row in series. The twenty-fifth tab 625 connects positive and negative electrodes of two unit cells 40 of the fourth and sixth columns of the second row in series. For example, in the configuration of FIGS. 9-10, the tabs connect ten individual unit cells 40 in series, while the tabs in FIGS. 5-8 are configured to connect columns of unit cells 40, rather than individual unit cells 40, in series.

Thus, in the third use state, the rechargeable battery pack 100 outputs power of a utilization voltage of 36V when a voltage of the unit cell 40 is 3.6V. In this case, the unit cells 40 of the first and fifth columns of the second row are not in an operation state.

Hereinafter, a second exemplary embodiment will be described in detail. The same constitution as the first exemplary embodiment and the aforementioned exemplary embodiment will be omitted, and the different constitution will be described.

Figure 11:
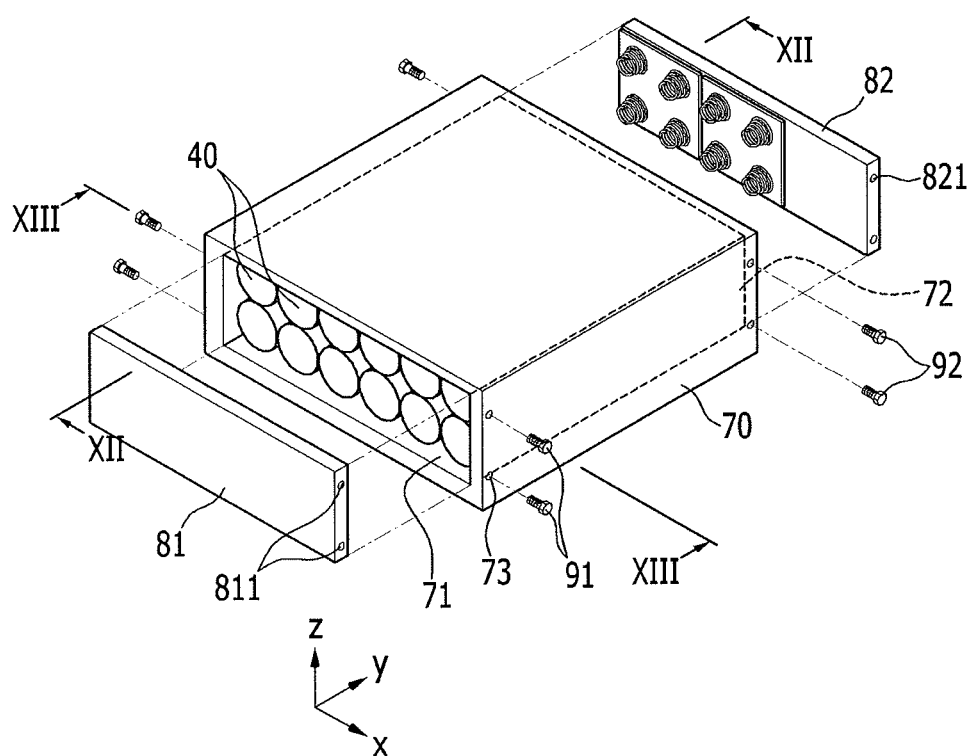
FIG. 11 illustrates an exploded view of a rechargeable battery pack according to a second exemplary embodiment.
Figure 12:
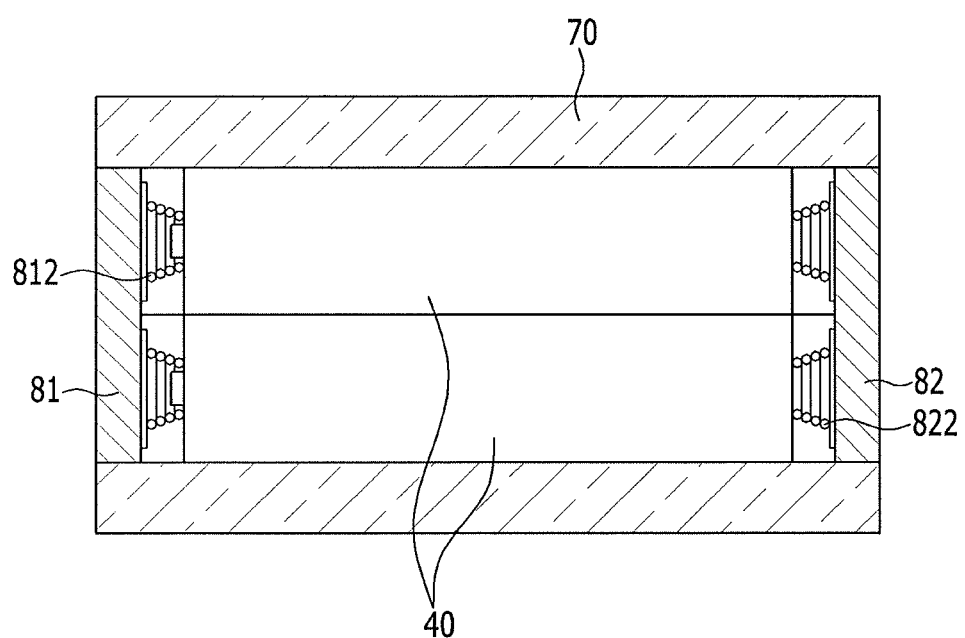
FIG. 12 illustrates a cross-sectional view of FIG. 11, taken along line XII-XII.
Figure 13:
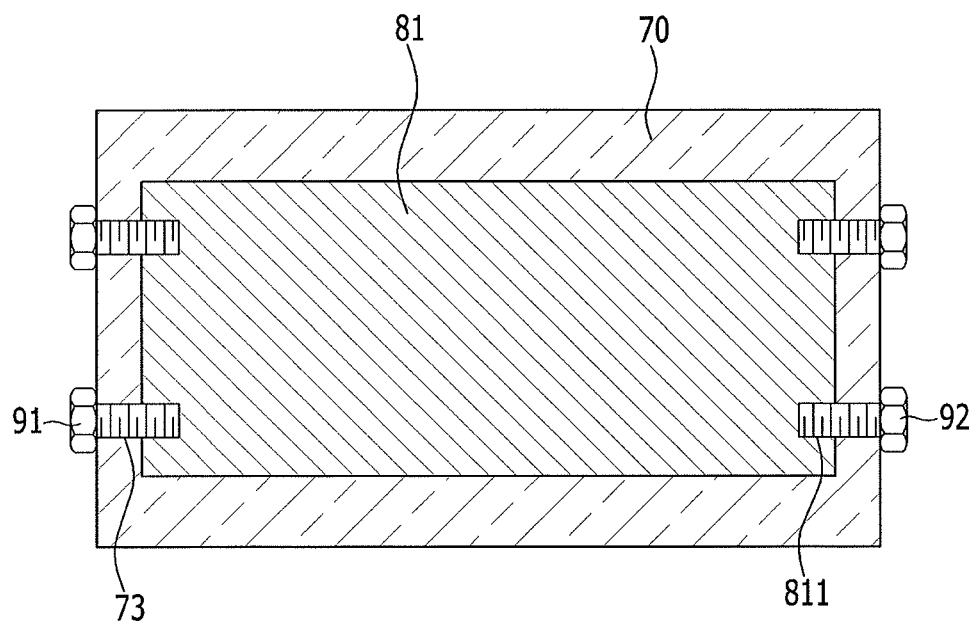
FIG. 13 illustrates a cross-sectional view of FIG. 11, taken along line XIII-XIII.

FIG. 11 illustrates an exploded perspective view of a rechargeable battery pack 200 according to the second exemplary embodiment, FIG. 12 illustrates a cross-sectional view of FIG. 11, taken along the line XII-XII, and FIG. 13 illustrates a cross-sectional view of FIG. 11, taken along the line XIII-XIII.

Referring to FIG. 11 to FIG. 13, a case 70 may include a through-hole 73 formed in a direction (i.e., x-axis direction) that crosses a length direction (i.e., y-axis direction) of the unit cells 40 at an external circumference of a first opening 71 and an external circumference of a second opening 72. That is, as illustrated in FIG. 11, a depth of each through-hole 73 extends along the x-axis direction, i.e., along a direction perpendicular to a longitudinal direction of the unit cells 40. The through-holes 73 are formed at four corners of two facing lateral side walls of the case 70.

In addition, a first cover 81 and a second cover 82 are inserted into the first opening 71 and the second opening 72, respectively. The first and second covers 81 and 82 are disposed in correspondence to an internal circumference of each of the first and second openings 71 and 72, and include fastening holes 811 and 821 corresponding to the through-holes 73 in the case 70. For example, as illustrated in FIGS. 11 and 13, an internal circumference of the opening 71 of the case 70 surrounds the first cover 81, so an outer surface of the first cover 81 is level with a surface of the case 70 defining the first opening 71. Fastening members 91 and 92 penetrate through the through-hole 73 of the case 70 and then fastened to the fastening holes 811 and 821 in sidewalls of the first and second covers 81 and 82, respectively. Therefore, the first cover 81 and the second cover 82 are coupled to the case 70.

For example, the fastening members 91 and 92 may be formed as set screws and thus may be screw-coupled to the fastening holes 811 and 821 of the first cover 81 and the second cover 82, respectively, and through the through-hole 73 of the case 70. In this case, a direction of a fastening force of the fastening members 91 and 92 is applied in the x-axis direction and is perpendicular to the length direction (i.e., y-axis direction) of the unit cells 40. That is, the direction of the fastening force of the fastening members 91 and 92 crosses an elasticity direction (i.e., y-axis direction) of elastic portions 812 and 822 in the first and second covers 81 and 82. Thus, the fastening members 91 and 92 can improve the fastening force of the first cover 81 and the second cover 82 with respect to the case 70.

According to the exemplary embodiment, terminals of the unit cells installed in a case can be electrically connected in various manners, e.g., configurations, by the first cover and the second cover, so power of varying voltages may be output by the unit cells. That is, each of the first and second covers of a battery pack may include multiple conductive tabs, so the conductive tabs may electrical connect the unit cells in the battery pack via elastic connections in different configurations, e.g., different numbers of unit cells and/or different serial/parallel connections, thereby facilitating different voltage outputs from the same battery pack.

In contrast, when unit cells and conductive tabs in a conventional battery pack are welded, the electric connection of the unit cells is fixed. As such, the conventional rechargeable battery pack may output power of only a single utilization voltage. In addition, the unit cells may be damaged due to an arc generated from the welding.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A rechargeable battery pack, comprising:
   a case with first and second openings, the first and second openings facing each other;
   a plurality of unit cells in the case, each unit cell including a rechargeable battery and having a longitudinal direction extending from the first opening of the case toward the second opening of the case;
   a first cover coupled to the first opening of the case, the first cover selectively connecting, via elastic contacts, terminals of the unit cells facing the first opening; and
   a second cover coupled to the second opening of the case, the second cover connecting, via elastic contacts, terminals of the unit cells facing the second opening in correspondence to terminals connected through the first cover, wherein:
   the first cover and the second cover include a first tab and a second tab, respectively, the first and second tabs facing the unit cells, and
   the elastic contacts protrude from the first tab and the second tab and contact respective terminals of the unit cells.

2. The rechargeable battery pack as claimed in claim 1, wherein:
   the case includes fastening holes in a length direction of the unit cell, the fastening holes being at external circumferences of the first and second openings,
   the first cover and the second cover include through-holes corresponding to the fastening holes, and
   the first cover and the second cover are connected to the case by fasteners through the fastening holes and the through-holes.

3. The rechargeable battery pack as claimed in claim 1, wherein the unit cells are arranged in the case in a two row by six column matrix.

4. The rechargeable battery pack as claimed in claim 3, wherein the first tab of the first cover includes:
   an eleventh tab corresponding to a first column of unit cells among the six columns of unit cells;

a twelfth tab corresponding to a second column of unit cells neighboring the first column of unit cells and to a third column of unit cells; and a thirteenth tab corresponding to a fourth column of unit cells neighboring the third column of unit cells.

5. The rechargeable battery pack as claimed in claim 4, wherein the second tab of the second cover includes:
   a twenty-first tab corresponding to the first and second columns of unit cells; and
   a twenty-second tab corresponding to the third column of unit cells neighboring the second column of unit cells and to the fourth column of unit cells.

6. The rechargeable battery pack as claimed in claim 5, wherein an output power of the rechargeable battery pack is four times a voltage of the unit cell.

7. The rechargeable battery pack as claimed in claim 3, wherein the first tab of the first cover includes:
   an eleventh tab corresponding to a first column of unit cells among the six columns of unit cells;
   a twelfth tab corresponding to a second column of unit cells neighboring the first column of unit cells and to a third column of unit cells; and
   a thirteenth tab corresponding to a fourth column of unit cells neighboring the third column of unit cells and to a fifth column of unit cells.

8. The rechargeable battery pack as claimed in claim 7, wherein the second tab of the second cover includes:
   a twenty-first tab corresponding to the first and second column of unit cells;
   a twenty-second tab corresponding to the third column of unit cells neighboring the second column of unit cells and to the fourth column of unit cells; and
   a twenty-third tab corresponding to the fifth column of unit cells neighboring the fourth column of unit cells.

9. The rechargeable battery pack as claimed in claim 8, wherein an output power of the rechargeable battery pack is five times a voltage of the unit cell.

10. The rechargeable battery pack as claimed in claim 3, wherein the first tab of the first cover includes:
    an eleventh tab corresponding to a unit cell in a first column in a first row among the two rows and the six columns of unit cells;
    a twelfth tab corresponding to unit cells in second and third columns in the first row;
    a thirteenth tab corresponding to unit cells in fourth and fifth columns of the first row;
    a fourteenth tab corresponding to unit cells in the second column of a second row among the two rows and the six columns of unit cells;
    a fifteenth tab corresponding to unit cells in the third and fourth columns of the second row; and
    a sixteenth tab corresponding to unit cells in the sixth column.

11. The rechargeable battery pack as claimed in claim 10, wherein the second tab in the second cover includes:
    a twenty-first tab corresponding to unit cells in the first and second columns of the first row;
    a twenty-second tab corresponding to unit cells in the third and fourth columns of the first row;
    a twenty-third tab corresponding to unit cells in the fifth and sixth columns of the first row;
    a twenty-fourth tab corresponding to unit cells in the second and third columns of the second row; and
    a twenty-fifth tab corresponding to unit cells in the fourth and sixth columns of the second row.

12. The rechargeable battery pack as claimed in claim 11, wherein an output power of the rechargeable battery pack is ten times a voltage of the unit cell.

13. The rechargeable battery pack as claimed in claim 1, wherein:
    the case includes through-holes in a direction that crosses a length direction of the unit cells at external circumferences of the first and second openings,
    the first cover and the second cover include fastening holes inserted to interior circumferences of the first and second openings and corresponding to the through-holes, and
    the first cover and the second cover are connected to the case by fasteners through the fastening holes and the through-hole.

14. The rechargeable battery pack as claimed in claim 1, wherein the plurality of unit cells are located within the first and second openings.

* * * * *